S. E. BRETHERTON.
MEANS FOR THE MAINTENANCE OF GAS IN CONFINEMENT.
APPLICATION FILED OCT. 9, 1912.
1,082,797.
Patented Dec. 30, 1913.
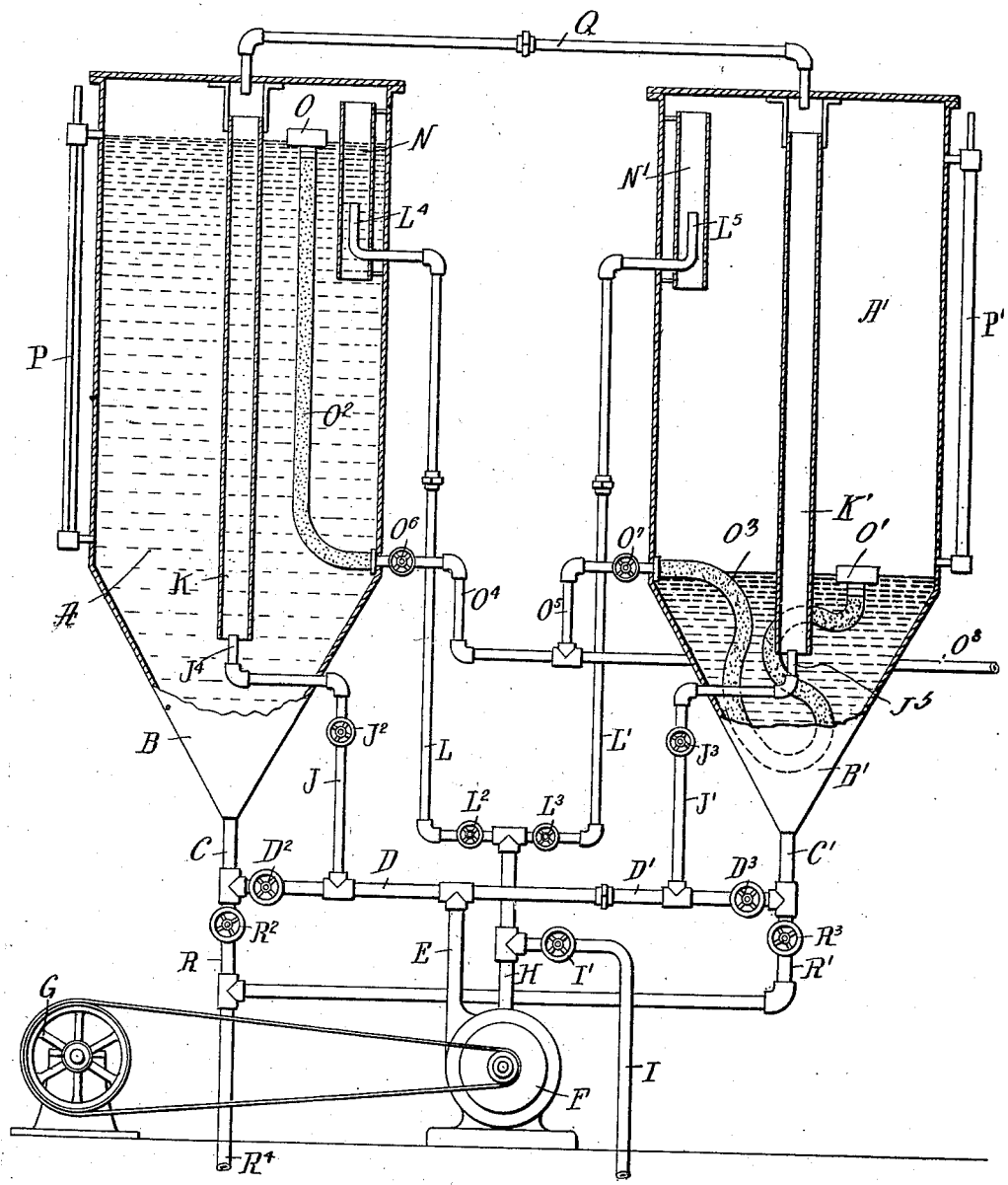
WITNESSES
H. J. Walker
INVENTOR
Sidney E. Bretherton,
BY
ATTORNEYS

UNITED STATES PATENT OFFICE.

SIDNEY ELLIOTT BRETHERTON, OF BERKELEY, CALIFORNIA.

MEANS FOR THE MAINTENANCE OF GAS IN CONFINEMENT.

1,082,797.  Specification of Letters Patent.  Patented Dec. 30, 1913.

Application filed October 9, 1912. Serial No. 724,801.

*To all whom it may concern:*

Be it known that I, SIDNEY E. BRETHERTON, a citizen of the United States, and a resident of Berkeley, in the county of Alameda and State of California, have invented a new and Improved Means for the Maintenance of Gas in Confinement, of which the following is a full, clear, and exact description.

The invention relates to metallurgical and similar processes, and its object is to provide a new and improved means for the maintenance of gas in confinement while agitating, decanting and refilling vessels with solutions either continuously or intermittently and without danger of free air from outside sources passing into the apparatus, thus preventing dilution of the gas and impairment of the decanting process.

In order to produce the desired result, use is made of at least two closed vessels connected with each other at the top to allow gas to pass from one receptacle into the other during the time the liquid in one receptacle is decanted while the other is charged.

A practical embodiment of the invention is represented in the accompanying drawing forming a part of this specification, in which the figure is a sectional side elevation of a pair of ore agitators forming part of the ammonia extraction plant for the extraction of copper, zinc and other metals from slimed ores and leaving the residue in a more suitable condition for the extraction of gold and silver by any of the old methods, cyaniding or smelting.

Two closed vessels A and A', of like construction are preferably arranged in close proximity one to the other, as indicated in the drawing, and the said vessels A and A' are provided with hopper-shaped bottoms B, B' from the apexes of which extend pipes C, C'. The pipes C, C' are connected by branch pipes D, D' with the discharge pipe E of a pump F of any approved construction, preferably a centrifugal pump driven from a suitable motor G. The branch pipes D and D' are provided intermediate the pipes C and E and the pipes E and C' with valves $D^2$ and $D^3$. The inlet pipe H of the pump F is provided with a pipe I, connected by valved branch pipes with various tanks (not shown) for pumping different solutions as required in the carrying out of the desired metallurgical or other process, the pipe I being provided adjacent the pipe H with a valve I'. From the branch pipes D, D' intermediate the pipe E and the valves $D^2$, $D^3$ extend pipes J, J' opening into the vessels A, A' a distance above the lower ends thereof, as plainly indicated in the drawing. The pipes J, J' are provided with valves $J^2$, $J^3$, and the inner upturned ends $J^4$, $J^5$ of the pipes J, J' discharge into the lower ends of agitating tubes K, K' suspended vertically within the vessels A, A' and terminating at their upper ends a distance from the tops of the vessels A, A'. The pipe H is connected with pipes L, L' provided with valves $L^2$, $L^3$ and having their upper upturned ends $L^4$, $L^5$ extending into settling tubes N, N' suspended within the upper portion of the vessels A and A', as indicated in the drawing. Decanters O O' preferably of the floating type are adapted to float on the levels of the liquids with which the vessels A and A' are filled, as hereinafter more fully described, and the said floating decanters O, O' are connected by flexible pipes $O^2$, $O^3$ with pipes $O^4$, $O^5$ having valves $O^6$, $O^7$ and leading to a pipe $O^8$ connected with a sump tank for receiving the liquid decanted out of the vessels A and A', and which liquid is to be pumped from the sump tank into a copper precipitating tank, not shown. Gages P and P' are arranged on the vessels A, A' to indicate the level of the liquids or solutions contained therein. The upper ends of the vessels A and A' are connected with each other by a pipe Q for conducting the gas contained in the upper portion of one vessel into the upper portion of the other vessel to permit the proper decanting of the liquid from one vessel while filling the other vessel with the desired liquid. From the pipes C and C' lead the discharge pipes R, R' provided with valves $R^2$, $R^3$ and connected with a pipe $R^4$ for conducting the residue to a suitable place of discharge, as hereinafter more fully described, that is, to a filter press or to leaching tanks for the extraction of the gold and silver.

The operation takes place according to the following schedule: 1, filling A (decanting wash A'); 2, agitating A (removing residue A'); 3, decanting A, filling A'; 4, rest, agitating A'; 5, filling wash A, decanting A'; 6, agitating wash A, rest; 7, decanting wash A, filling wash A'; 8, removing residues A, agitating wash A'.

In detail the operation is as follows: Presuming that the vessel A is filling with slimed ore while the wash water from a previous operation is decanting in the vessel A', the several parts then being in the position shown in Fig. 1. During this operation all the valves except the valves I', D² and O⁷ are closed and the pipe I is connected with a tank containing slimed ore so that the latter is pumped by the pump F into the vessel A, while the wash water in the vessel A' is decanted by way of the decanter O', pipes O³, O⁵ and O⁸. When the vessel A is filled, the valves I', D² and O⁷ are closed and the valves J and L² are opened so that the pump F circulates the solution in the vessel A, that is, produces hydraulic agitation therein. During this time the valve R³ is opened so that the residues in the vessel A' are run off to a filter press or to leaching tanks for the extraction of gold and silver. When this has been done the valve R³ is again closed. The liquid contained in the vessel A is now decanted by opening the valve O⁶ so that the clear solution flows out of the vessel A by way of the decanter O, flexible tube O² and pipes O⁴, O⁸. The clear solution flows to a sump tank from which it is pumped to a copper precipitator. During this decanting operation the valves I' and D³ are opened to fill the vessel A' with a slimed ore solution. The residue in the vessel A remains at rest while the solution contained in the vessel A' is subjected to hydraulic action by opening the valves J³ and L³. After the agitation in the vessel A' has been completed the valves J³ and L³ are closed and the pump F is now utilized for pumping wash water containing the necessary amount of ammonia solution into the vessel A from a tank containing such solution, the valves I' and D² being opened for the purpose. During this operation decanting takes place in the vessel A' by opening the valve O⁷ to run the clear solution out of the vessel A' by way of the decanter O', flexible tube O³, pipes O⁵ and O⁸. The clear solution flows to a sump tank from which it is pumped to a copper precipitator. The next action is producing hydraulic agitation in the vessel A of the wash water contained therein, and during this time the solution in the vessel A' remains at rest. The next operation is decanting the wash water from the vessel A while filling the vessel A' with wash water. Then the residues are removed from the vessel A while the wash water is agitated in the vessel A'. The above described operation can then be repeated.

From the foregoing it will be seen that the decanting operation in each vessel A and A' is carried out without the admission of atmospheric air, it being understood that the gas contained in the vessel A' can flow into the vessel A at the time decanting takes place in the latter, and the vessel A' is filled with the slimed ore solution, and the gas can pass from the vessel A into the vessel A' at the time decanting takes place in the vessel A' and the vessel A is filled with slimed ore solution. By the arrangement described dilution of the gas and impairment of the decanting process is completely avoided.

Having thus described my invention, I claim as new and desire to secure by Letters Patent:

1. An apparatus of the class described, comprising at least two closed vessels, a gas-conducting connection between the upper ends of the vessels to allow gas from one vessel to pass into the other, means for alternately filling the vessels, and means for alternately decanting the liquids in the vessels, the decanting of the liquid in one vessel taking place while the other vessel is filled.

2. An apparatus of the class described, comprising at least two closed vessels, a gas-conducting connection between the upper ends of the vessels to allow gas from one vessel to pass into the other, means for alternately filling the vessels, means for alternately decanting the liquids in the vessels, the decanting of the liquid in one vessel taking place while the other vessel is filled, and means for producing alternate hydraulic agitation in the said vessels at the time the corresponding vessel is filled.

3. An apparatus of the class described, comprising at least two closed vessels, a gas-conducting connection between the upper ends of the vessels to allow gas from one vessel to pass into the other, means for alternately filling the vessels, means for alternately decanting the liquids in the vessels, the decanting of the liquid in one vessel taking place while the other vessel is filled, means for producing alternate hydraulic agitation in the said vessels at the time the corresponding vessel is filled, and means for alternately drawing off the residue from the lower ends of the vessels.

4. An apparatus of the class described, comprising at least two closed vessels of like construction and each having a hopper-shaped bottom, a gas-conducting pipe connecting the upper ends of the said vessels with each other, an agitating pipe suspended in the said vessels, a pump having three valved connections with each vessel, one pipe connection opening into the apex of the bottom of the corresponding vessel, another pipe connection opening centrally into one of the agitating pipes and the third pipe connection opening into the other agitating pipe, decanters in the said vessel, a discharge pipe having valved connections with the said decanters, and valved discharge pipes connected with the lower ends of the vessels.

5. An apparatus for the maintenance of gas in confinement, comprising at least two closed vessels, means for alternately filling and emptying the vessels, means for decanting the liquid in one vessel while filling the other vessel, and means for conducting the gas from the filling vessel into the decanting vessel.

In testimony whereof I have signed my name to this specification in the presence of two subscribing witnesses.

SIDNEY ELLIOTT BRETHERTON.

Witnesses:
FLORA HALL,
A. E. LOWRIE.

Copies of this patent may be obtained for five cents each, by addressing the "Commissioner of Patents, Washington, D. C."